United States Patent [19]
Fukui et al.

[11] Patent Number: 5,838,689
[45] Date of Patent: Nov. 17, 1998

[54] CELL RECEIVER

[75] Inventors: Akito Fukui, Yokohama; Shinobu Yagi, Machida; Katsuyuki Yamazaki, Tokyo, all of Japan

[73] Assignees: Matsushita Electric Industrial Co., Ltd, Osaka; Kokusai Denshin Denwa Co., Ltd., Tokyo, both of Japan

[21] Appl. No.: 676,955

[22] Filed: Jul. 8, 1996

[30] Foreign Application Priority Data

Jul. 11, 1995 [JP] Japan ..................... 7-174707
Jul. 13, 1995 [JP] Japan ..................... 7-177765

[51] Int. Cl.$^6$ ........................... H04J 3/16
[52] U.S. Cl. ................. 370/465; 370/395; 370/474
[58] Field of Search ................. 370/465, 474, 370/253, 395, 468, 505, 506, 517, 519, 545

[56] References Cited

U.S. PATENT DOCUMENTS

| | | | |
|---|---|---|---|
| 5,412,642 | 5/1995 | Nunokawa | 370/253 |
| 5,509,001 | 4/1996 | Tachibana et al. | 370/465 |
| 5,541,926 | 7/1996 | Saito et al. | 370/474 |
| 5,557,604 | 9/1996 | Usumi et al. | 370/474 |
| 5,570,368 | 10/1996 | Murakami et al. | 370/395 |
| 5,608,719 | 3/1997 | Hyodo et al. | 370/395 |

*Primary Examiner*—Chi H. Pham
*Assistant Examiner*—Steven Nguyen
*Attorney, Agent, or Firm*—Spencer & Frank

[57] ABSTRACT

A cell receiver includes, in addition to a cell decomposing unit, an interleaving memory, an error correcting unit, a FIFO memory, and a delay fluctuation absorption control unit, a delay fluctuation absorption buffer for absorbing delay fluctuation of a received cell, and a buffer control unit for controlling a read operation of a cell from the delay fluctuation absorption buffer. Since the delay fluctuation of a received cell is absorbed by the delay fluctuation absorption buffer, the number of memories necessary for interleaving can by reduced to two memories.

7 Claims, 16 Drawing Sheets

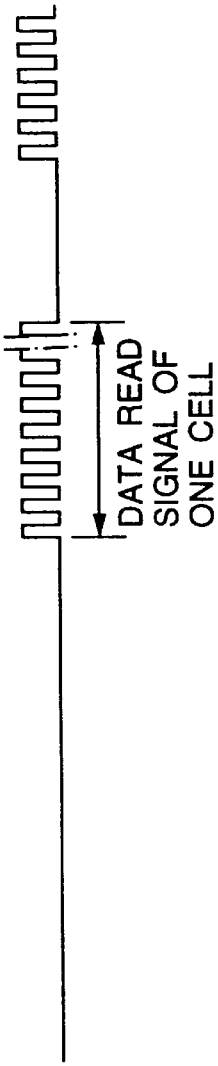
FIG. 4A  READ START SIGNAL 102
FIG. 4B  READ SIGNAL 103 FOR SPEED CONVERSION FIFO MEMORY
FIG. 4C  COUNTER 731
FIG. 4D  OUTPUT OF TABLE 732
FIG. 4E  OPERATION CLOCK 304
FIG. 4F  READ SIGNAL 104

FIG. 13A PRIOR ART  INFORMATION RECEIVED FROM TERMINAL

FIG. 13B PRIOR ART  INFORMATION WITH ERROR CORRECTING CODES

FIG. 13C PRIOR ART  INTERLEAVING MEMORY

FIG. 13D PRIOR ART  DATA SETS EACH HAVING 47 OCTETS

FIG. 13E PRIOR ART  CELL DATA OUTPUT FROM CELL TRANSMISSION SIDE

ERROR CORRECTING CODES (4 OCT.)

HEADER + AAL HEADER

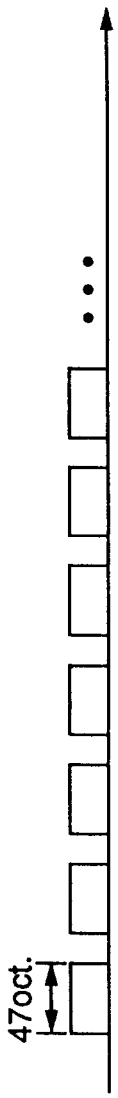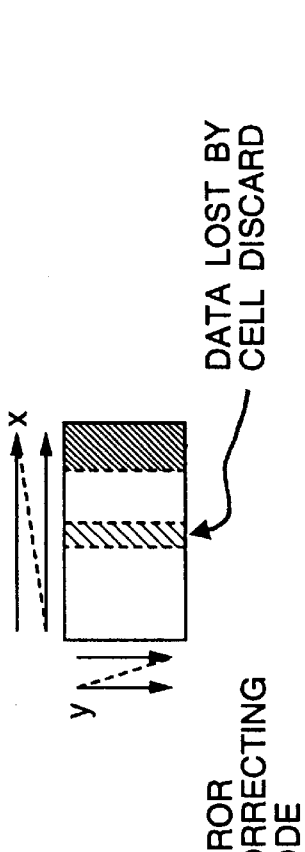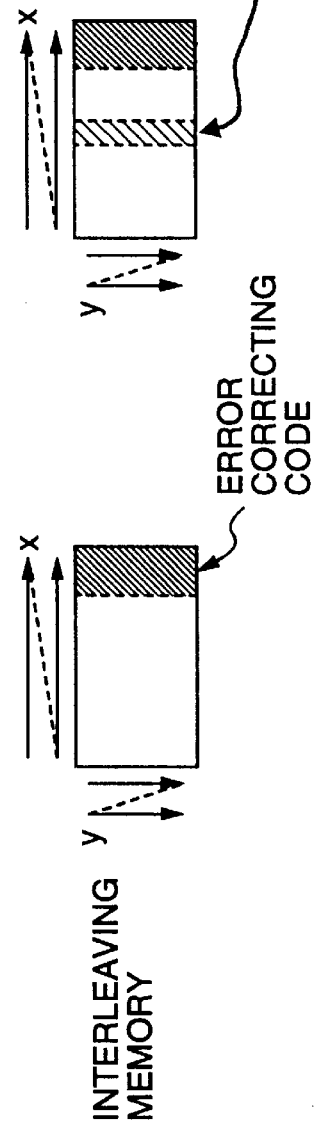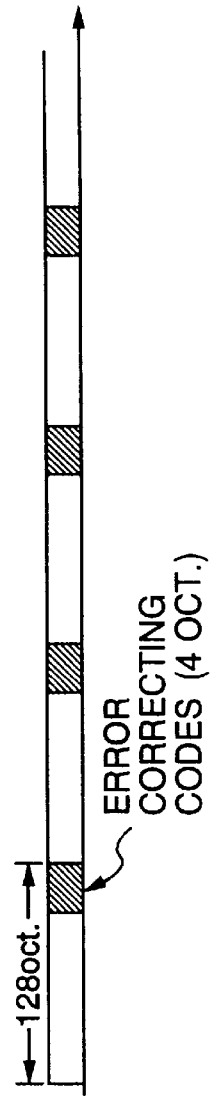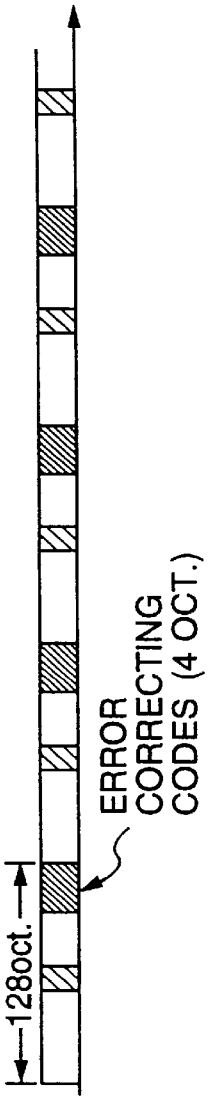
FIG. 14A PRIOR ART PAYLOAD OF RECEIVED CELL
FIG. 14B PRIOR ART
FIG. 14C PRIOR ART
FIG. 14D PRIOR ART OUTPUT FROM INTERLEAVING MEMORY (WITHOUT CELL DISCARD)
FIG. 14E PRIOR ART OUTPUT FROM INTERLEAVING MEMORY (WITH CELL DISCARD)

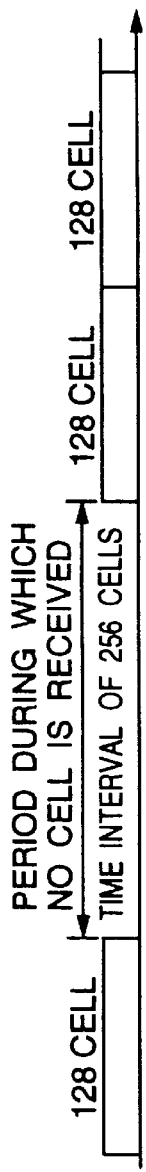
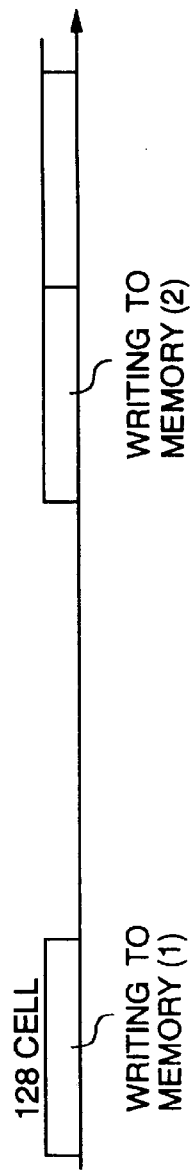
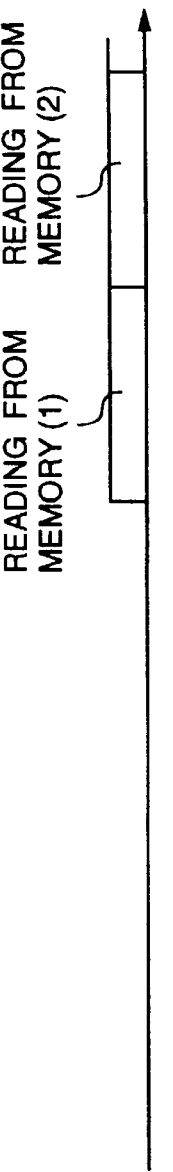
FIG. 16A PRIOR ART  RECEIVED CELL
FIG. 16B PRIOR ART  WRITING TO INTERLEAVE MEMORY
FIG. 16C PRIOR ART  START OF READING FROM INTERLEAVE MEMORY
FIG. 16D PRIOR ART  OUTPUT OF INTERLEAVING MEMORY

CELL RECEIVER

BACKGROUND OF THE INVENTION

1. Field of the Invention

The present invention relates to an ATM (asynchronous transfer mode) cell receiver used for ATM communication of information at a fixed speed.

2. Description of the Related Art

In the ATM technique for transmission and switching of information in the form of fixed length packets called a cells, losses (discards) of cells and bit errors are inevitable during transmission. In order to recover losses (discards) of cells and errors of bits, an error correcting system combining octet interleaving and error correcting-codes has been used in some cases (ITU-T Recommendations I.363).

An error correcting system combining octet interleaving and error correcting-codes will be described. FIG. 12 shows the format of a cell used by this error correcting system. A header 81 contains information such as a cell destination which this error correcting system does not use. An AAL header 82 contains information used by a reception side to detect any loss (discard) of a cell. A serial number is inserted into the AAL header 82 at a transmission side. Data is inserted in a payload 83 to transmit it to the reception side.

FIGS. 13A to 13E are timing charts illustrating a procedure at the cell transmission side in which information received from a terminal is processed by the error correcting system and cells are assembled. At the cell transmission side, each time information of 124 octets is received from the terminal (FIG. 13A), error correcting-codes of four octets are added thereto to assemble a block having a length of 128 octets (FIG. 13B). Such blocks having a length of 128 octets are sequentially written in an interleaving memory in the x-direction, the interleaving memory having a capacity of 128×47 octets (FIG. 13C). After all of the data is written in the interleaving memory, it is sequentially read in the y-direction to form octet-interleaved data sets each having 47 octets (FIG. 3D). At the cell transmission side, the data of 47 octets is inserted into the payload of a cell and transmitted (FIG. 13E).

Next, a procedure at the cell reception side will be described in which information at the original fixed speed is recovered from received cells. FIGS. 14A to 14E are timing charts illustrating the procedure at the cell reception side. First, the serial number inserted in the AAL header of a received cell is checked. If the correct serial number is present, the data of 47 octets inserted in the payload of the received cell (FIG. 14A) is sequentially written in an interleaving memory in the y-direction, the interleaving memory having the capacity of 128×47 octets (FIG. 14B). If serial numbers are missing, the data of 47 octets of the received cell is written in the interleaving memory after the field of a interleaving memory corresponding in size to the number of missing serial numbers is made empty (FIG. 14C). After all payload data is written in the interleaving memory, it is sequentially read in the x-direction to recover the data sets each having 128 octets (FIG. 14B). The last four octets of the 128 octets are error correcting-codes added at the transmission side. By using these error-correcting codes, data lost by cell discards or bit errors during transmission can be recovered.

For example, if one cell was discarded (FIG. 14C), data is missing at one column in the y-direction of the interleaving memory. In this case, each data set of 128 octets in the x-direction read from the interleaving memory has one missing octet among its 128 octets (FIG. 14E). This one missing octet is recovered by using the error correcting codes.

With this error correcting system, data lost by cell discards or bit errors during transmission can be recovered.

FIG. 15 is a diagram showing the structure of a conventional cell receiver. The cell receiver receives cells assembled from data of a fixed speed and recovers the data of the original fixed speed, at the same time correcting any error with the error correcting system. In FIG. 15, reference numeral 111 represents a cell decomposing unit for processing the AAL header of a received cell. Reference numeral 112 represents an interleaving memory for storing payloads output from the cell decomposition unit 111 for the execution of octet interleaving. The interleaving memory 112 is constituted by a plurality of memories (1) to (n). Reference numeral 113 represents an error correcting unit for correcting bit errors of data read from the interleaving memory 112 by using the error correcting codes contained therein. Reference numeral 114 represents a speed conversion FIFO memory for storing data excepting the error correcting codes output from the error correcting unit 113 and converting the data into data having the fixed speed. Reference numeral 115 represents a delay fluctuation absorption control unit for counting the number of received cells and generating a timing when data is read from the interleaving memory 112, in order to absorb a delay fluctuation of each received cell.

The operation of the cell receiver constructed as above will be described. The cell decomposing unit 111 checks the serial number inserted in the AAL header of a received cell 1101. The serial number is inserted at the transmission side and a cell discard during transmission can be detected by checking whether or not the correct serial number is missing. After this check of the serial number, the payload of the cell (FIG. 14A) is sequentially written in the interleaving memory 112 in the y-direction (FIG. 14B). If a cell discard is detected from the serial number checking, the payload of the next cell is written in the interleaving memory 112 after a memory field corresponding in size to the number of missing serial numbers is made empty (FIG. 14C). After the whole field of the memory (1) of the interleaving memory 112 is filled with payloads, the memory (2) is used for storing other payloads.

The delay fluctuation absorption control unit 115 counts the number of received cells in order to absorb the delay fluctuation of a received cell 101. When a number of received cells corresponding to a preset delay fluctuation absorption amount is counted, an interleaving memory read start signal is set to "1" and output to the interleaving memory 112, the start signal "1" indicating that data is permitted to be read from the interleaving memory 112. The interleaving memory 112 outputs data when the interleaving memory read start signal takes "1". The data of 128 octets sequentially read from the interleave memory 112 in the x-direction is supplied to the error correcting unit 113 (FIG. 14D). By using the error detecting codes of four octets among the data of 128 octets output from the interleaving memory 112, the error correcting unit 113 recovers data lost by cell discards and transmission errors. The error correcting unit 113 writes data of 124 octets excepting the error correcting codes of four octets into the speed conversion FIFO memory 114. This data is read from the speed conversion FIFO memory 114 at a fixed speed to recover the data of the original fixed speed, and output to a terminal.

Even with the above conventional cell receiver, data of the original fixed speed can be recovered from received cells.

With the conventional cell receiver, however, it is necessary to use a plurality of interleaving memories (three or more) in order to absorb a delay fluctuation, if any, of received cells. There is therefore a problem of an increased hardware scale.

The operation when a received cell has a delay fluctuation will be described with reference to FIGS. 16A to 16D, which illustrate the case where the period while a cell is not received because of a delay fluctuation corresponds to 256 cells. A received cell (FIG. 16A) is written in the interleaving memory 112 (FIG. 16B). After data corresponding to the delay fluctuation is written in the interleaving memory 112, the delay fluctuation absorption control unit 115 sets the interleaving memory read start signal to "1" indicating a read start of the interleaving memory 112. In the example shown in FIGS. 16A to 16D, after payloads corresponding to 256 cells are written in the interleaving memory 112, data in the memory (1) of the interleaving memory 112 starts being read (FIG. 16C). In this manner, even if there is a period while a cell is not received because of a delay fluctuation, correct data can be continuously read from the interleaving memory 112.

However, if a cell has a large delay fluctuation, it is necessary to start reading data after a number of cells are stored in the interleaving memory. It is therefore necessary to prepare a plurality of memories (1) to (n) for storing cells and the scale of the hardware of the cell receiver increases.

SUMMARY OF THE INVENTION

It is an object of the present invention to solve the above problem with the conventional cell receiver and provide an excellent cell receiver with modest hardware requirement.

In order to achieve the above object, the cell receiver of this invention comprises, in addition to a cell decomposing unit, an interleaving memory, an error correcting unit, a speed conversion FIFO memory, and a delay fluctuation absorption control unit, a delay fluctuation absorption buffer for absorbing delay fluctuation of a received cell, and a buffer control unit for controlling a read operation of a cell from the delay fluctuation absorption buffer, wherein after the delay fluctuation of a received cell is absorbed by the delay fluctuation absorption buffer, the cell payload is stored in the interleaving memory for the execution of octet interleaving.

In addition to the above structure, the buffer control unit may be constituted by a counter, a table, and a read signal generator unit, and the process performed by the buffer control unit is executed at a speed faster than the transmission speed of recovered data.

According to the present invention, after the delay fluctuation of a received cell is absorbed by the delay fluctuation absorption buffer, the cell payload is stored in the interleaving memory. Accordingly, it is unnecessary for the interleaving memory to absorb the delay fluctuation, and the number of interleaving memories can be reduced, and the scale of the hardware of the cell receiver can be reduced.

Further, the process performed by the buffer control unit is executed at a speed faster than the transmission speed of recovered data. Accordingly, the buffer control unit can be realized only by digital circuits, and the scale of the hardware of the buffer control unit can be reduced.

BRIEF DESCRIPTION OF THE DRAWINGS

FIGS. 4A to 4F are timing charts illustrating the operation of the second embodiment.

FIGS. 13A to 13E are first timing charts illustrating an error correcting system.

FIGS. 14A to 14E are second timing charts illustrating the error correcting system.

FIGS. 16A to 16D are timing charts illustrating the operation of the conventional cell receiver.

DETAILED DESCRIPTION OF THE PREFERRED EMBODIMENTS (First Embodiment)

Figure 1:
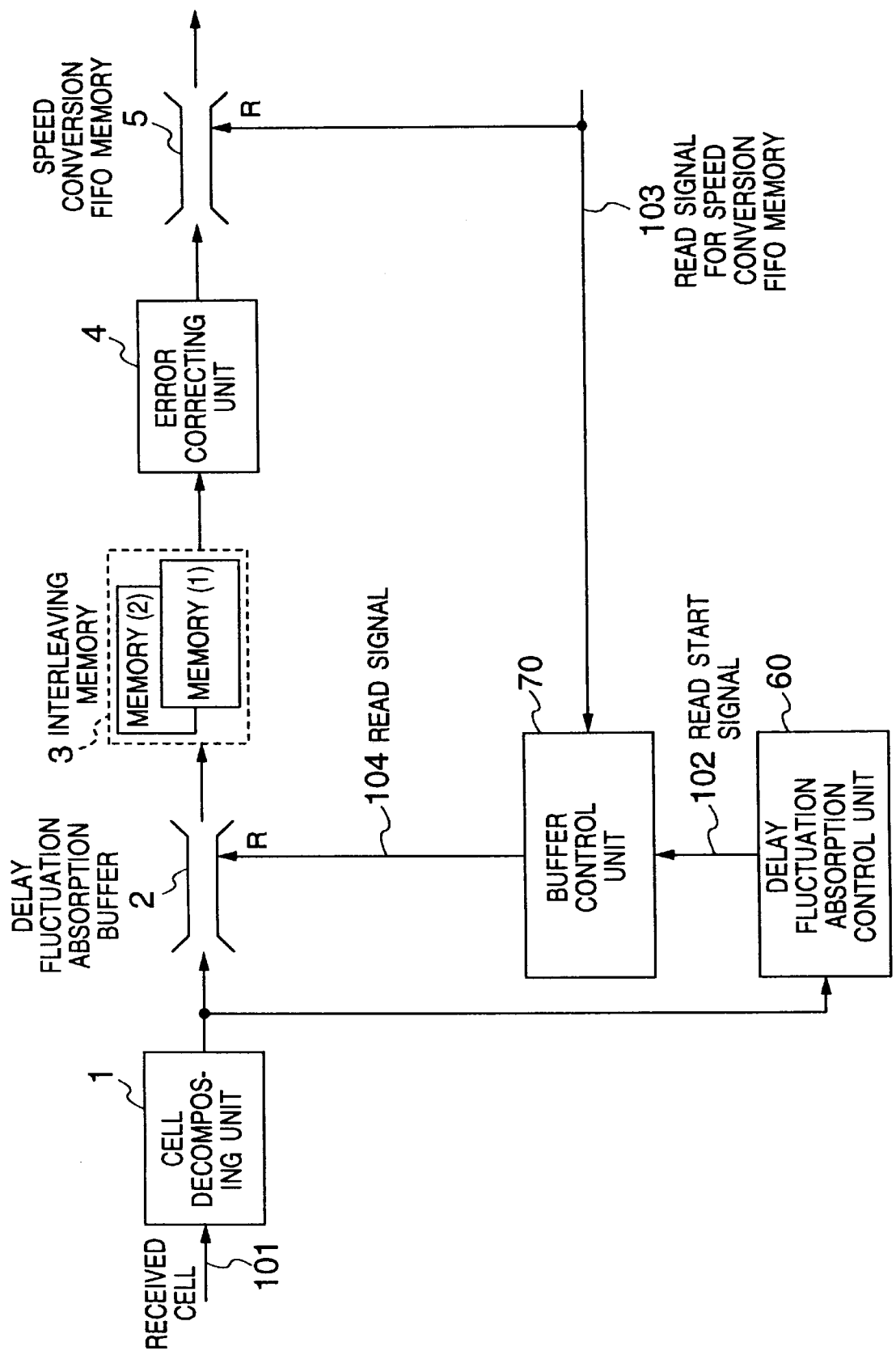
FIG. 1 is a block diagram showing the structure of a cell receiver according to a first embodiment of the invention.

FIG. 1 shows the structure of a cell receiver according to the first embodiment of the invention. In FIG. 1, reference numeral 1 represents a cell decomposing unit for processing the AAL header of a received cell 101. Reference numeral 2 represents a delay fluctuation absorption buffer for absorbing a delay fluctuation of a cell output from the cell decomposing unit 1, this buffer being made of a first-in-first-out (FIFO) memory. Reference numeral 3 represents an interleaving memory for storing a payload of a cell output from the delay fluctuation absorption buffer 2 for the execution of octet interleaving. Reference numeral 4 represents an error correcting unit for correcting any error in data output from the interleaving memory 3, by using the error correcting codes added to the data. Reference numeral 5 represents a speed conversion FIFO memory for storing data excepting the error correcting codes output from the error correcting unit 4 and converting the speed of the data into a fixed speed. Reference numeral 60 represents a delay fluctuation absorption control unit for calculating the number of received cells and generating a read start signal allowing to start reading data from the delay fluctuation absorption buffer 2. Reference numeral 70 represents a buffer control unit responsive to a speed conversion FIFO memory read signal 103, for generating a read signal 104 allowing to read a cell from the delay fluctuation absorption buffer 2.

Figure 2:
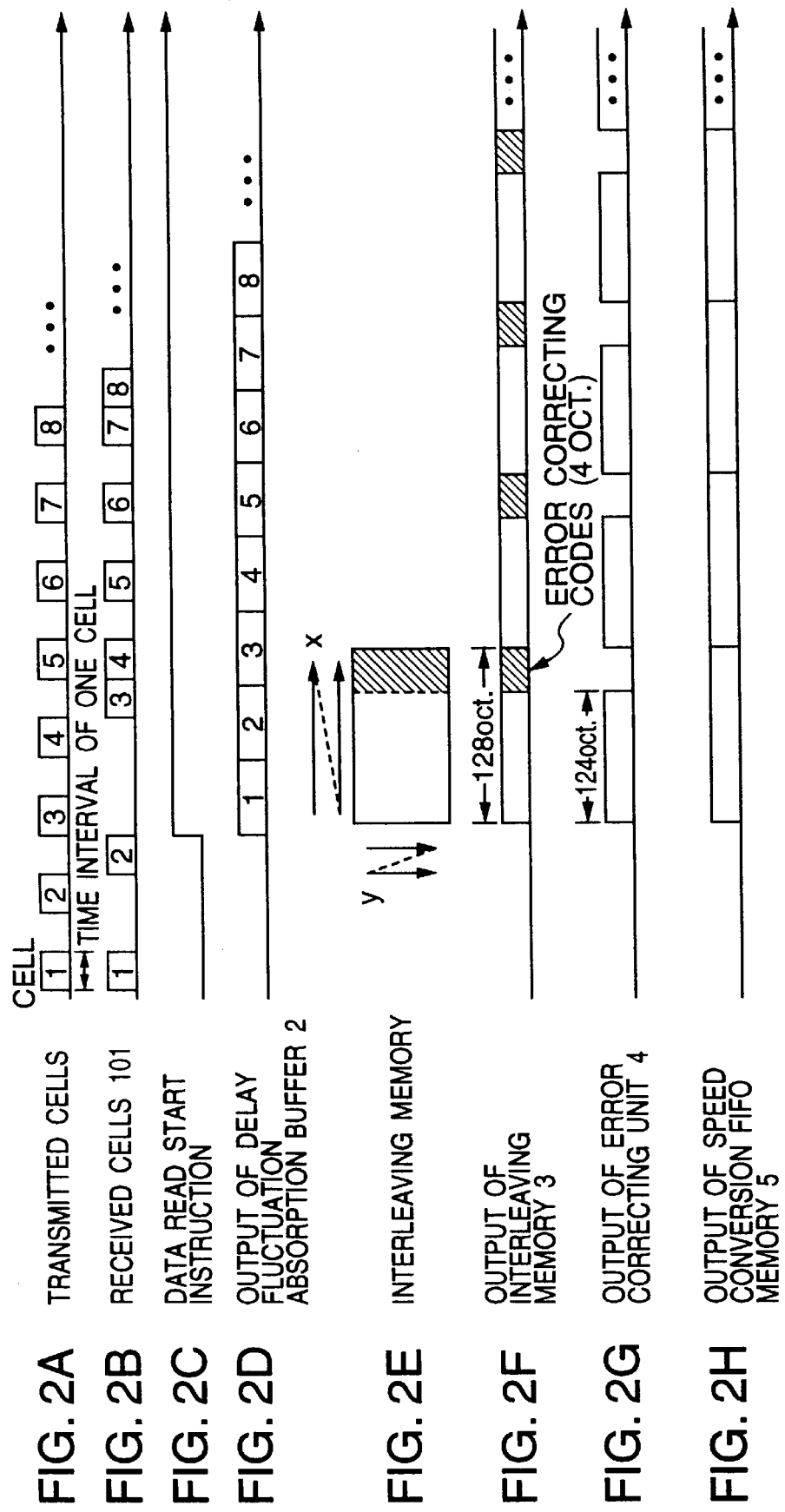
FIGS. 2A to 2H are timing charts illustrating the operation of the cell receiver of the first embodiment.

Next, the operation of the first embodiment will be described with reference to FIGS. 2A to 2H. FIG. 2A shows cells transmitted at an equal interval. FIG. 2B shows cells 101 received at the cell receiver, the interval between the received cells being irregular because of delay fluctuations.

In this embodiment, the cell decomposing unit 1 checks a serial number inserted in the AAL header of the received cell 101. After this check of the serial number, the cell is written in the delay fluctuation absorption buffer 2.

The delay fluctuation absorption control unit 60 counts the number of received cells in order to absorb the delay fluctuation of a received cell 101. When a number of received cells corresponding to a delay fluctuation absorption amount is counted, the start signal 102 is set to "1" and output to the buffer control unit 70, the start signal "1" indicating permission for reading a cell from the delay fluctuation absorption buffer 2. In the example shown in FIGS. 2A to 2H, the read start signal 102 of "1" is output after the time period corresponding to two cells (FIG. 2C).

In response to the read start signal 102 of "1" output from the delay fluctuation absorption control unit 60, the buffer control unit 70 outputs the read signal 104 to read the cell from the delay fluctuation absorption buffer 2.

The payloads of cells read from the delay fluctuation absorption buffer 2 (FIG. 2D) are sequentially written in the memory (1) of the interleaving memory 3 in the y-direction. After the memory (1) of the interleaving memory 3 is completely filled with payloads, the succeeding payloads are written in another memory (2). After the memory (2) is completely filled with payloads, the succeeding payloads are written again in the memory (1). In the interleaving memory 3, after the memory (1) is filled with payloads in a first cycle, data is sequentially read therefrom in the unit of 128 octets in the x-direction (FIG. 2F) and sent to the error correcting unit 4. In this case, the payloads written in the memory (1) in the first cycle are all read before a payload is written in the memory (1) in the second cycle, and payloads do not overwrite previously written payloads. Therefore, two memories (1) and (2) are sufficient for the octet interleaving process.

By using the error detecting codes of four octets among the data of 128 octets output from the interleaving memory 3, the error correcting unit 4 recovers data lost by cell discards or transmission errors. The error correcting unit 4 outputs data of 124 octets excepting the error correcting codes of four octets (FIG. 2G), the data being written in the speed conversion FIFO memory 5. The data is then read at a fixed speed from the speed conversion FIFO memory 5 to convert it into data of the original fixed speed which is output to a terminal (FIG. 2H).

As explained above, in the first embodiment, the delay fluctuation of a received cell is absorbed by the delay fluctuation absorption buffer 2. Therefore, the interleaving memory 3 is not required to absorb the delay fluctuation and the number of memories necessary for the interleaving memory is reduced to two memories. The hardware scale of the cell receiver can therefore be made small.

(Second Embodiment)

Next, the second embodiment will be described. The error correcting system uses the error correcting codes of four cells for the data of 124 cells. Therefore, during the period while the data of 124 cells is read from the speed conversion FIFO memory 5, the data of 128 cells including the error correcting codes is required to be read from the delay fluctuation absorption buffer 2. To this end, in the first embodiment, the buffer control unit 70 uses a phase-locked clock loop (PLL) to generate the delay fluctuation absorption buffer read signal 104 having a speed as fast as (the speed conversion FIFO memory read signal 103) x 128/124. This signal 104 is used for reading a cell from the delay fluctuation absorption buffer 2.

Figure 3:
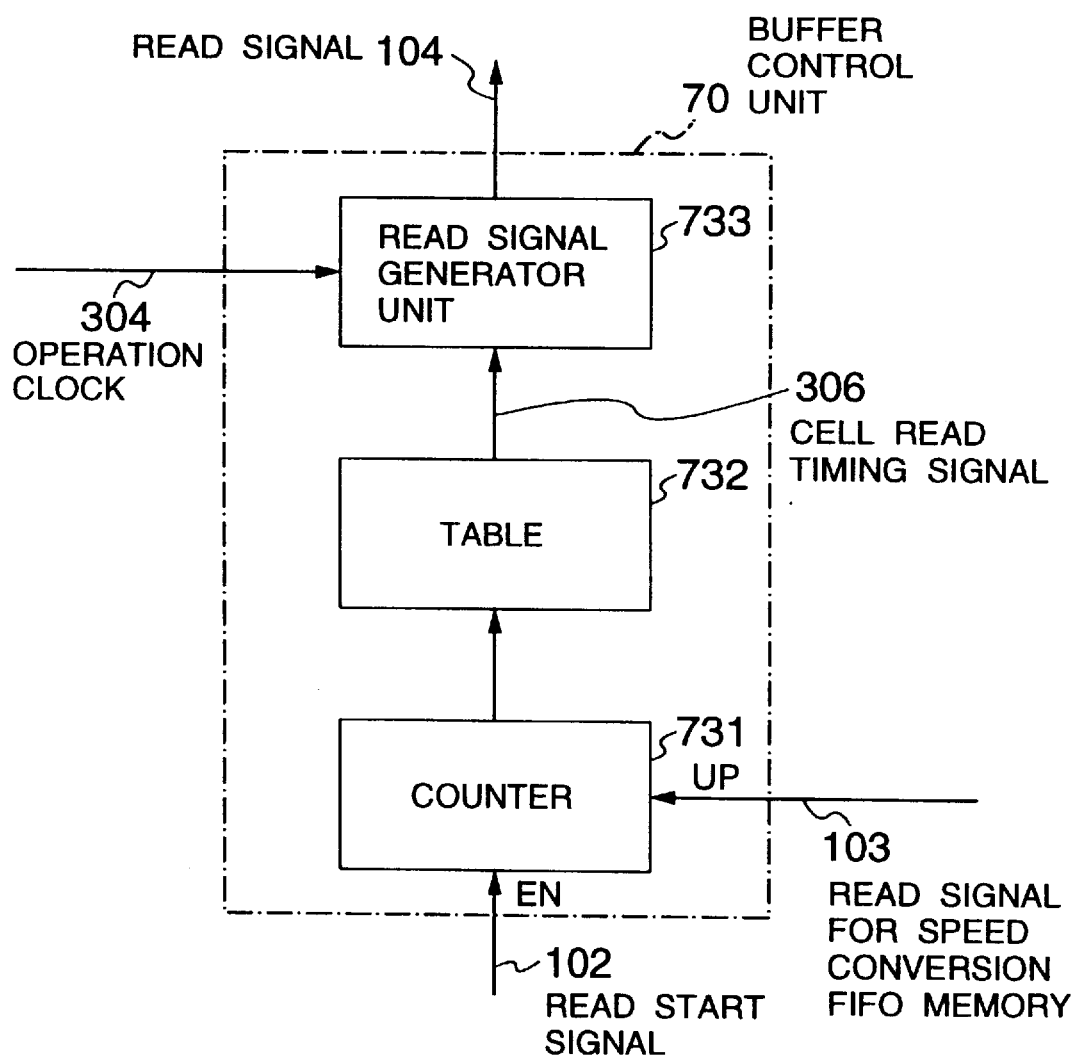
FIG. 3 is a block diagram showing the structure of a buffer control unit according to a second embodiment of the invention.

In the second embodiment of the invention, the PLL of the first embodiment becomes unnecessary by constituting the buffer control unit 70 by a counter, a table, and a read signal generator unit. FIG. 3 shows the structure of the buffer control unit 70 of the second embodiment. The buffer control unit 70 is constituted by a counter 731, a table 732, and a read signal generator unit 733. The table 732 is a memory for outputting a value preset at each address supplied from the counter 731, the preset value indicating whether or not a cell is read from the delay fluctuation absorption buffer 2. After the read start signal 102 output from the delay fluctuation control unit 60 takes the value "1", the counter 731 counts a speed conversion FIFO memory read signal 103. The counter 731 is reset to "0" when it counts up to 124×47 (the number of data sets excepting the error correcting codes capable of being stored in the interleaving memory 3). The read signal generator unit 733 generates the read signal 104 for reading a cell from the delay fluctuation absorption buffer 2, in accordance with the a cell read timing signal 307 output from the table 732 and an operation clock 304. This operation clock 304 is faster than the transmission speed of recovered data (e.g., the speed of transmitting cells).

Next, the operation of the buffer control unit 70 of this embodiment will be described. The error correcting system uses the error correcting codes of four cells for the data of 124 cells. Therefore, during the period while the data of 124 cells is read from the speed conversion FIFO memory 5, the data of 128 cells including the error correcting codes is required to be read from the delay fluctuation absorption buffer 2. To this end, after the read start signal 102 (FIG. 4A) becomes "1", the counter 731 counts the number of data sets (the number of speed conversion FIFO memory read signals 103 of "1") read from the speed conversion FIFO memory 5) and supplies the count (FIG. 4C) to the table 732. The table 732 outputs a timing when a cell is read from the delay fluctuation absorption buffer 2 (FIG. 4D). The table 732 stores a value indicating whether or not a cell is read from the delay fluctuation absorption buffer 2, the value being set such that data of 128 cells can be read from the delay fluctuation absorption buffer 2 during the period while the data of 124 cells is output from the speed conversion FIFO memory 5. The buffer control unit 70 generates the read signal (FIG. 4F) in accordance with the output from the table 732 (FIG. 4D) and the operation clock 304 (FIG. 4E).

In this manner, the buffer control unit 70 of this embodiment allows data of 128 cells including the error correcting codes to be read from the delay fluctuation absorption buffer 2 during the period while the data of 124 cells is output from the speed conversion FIFO memory 5.

According to the second embodiment, the process by the buffer control unit 70 is executed at a speed (e.g., a speed of transmitting cells) faster than the transmission speed of recovered data. It is therefore possible to realize the buffer control unit 70 by using digital circuits including the counter, table, and read signal generator unit, as opposed to analog circuits of the first embodiment. The buffer control unit can therefore be realized with a modest amount of hardware.

(Third Embodiment)

Next, the third embodiment will be described. In the third embodiment, the buffer control unit of the first embodiment is realized by a first counter, a second counter, a table, and a read signal generator unit, without necessitating a PLL.

Figure 5:
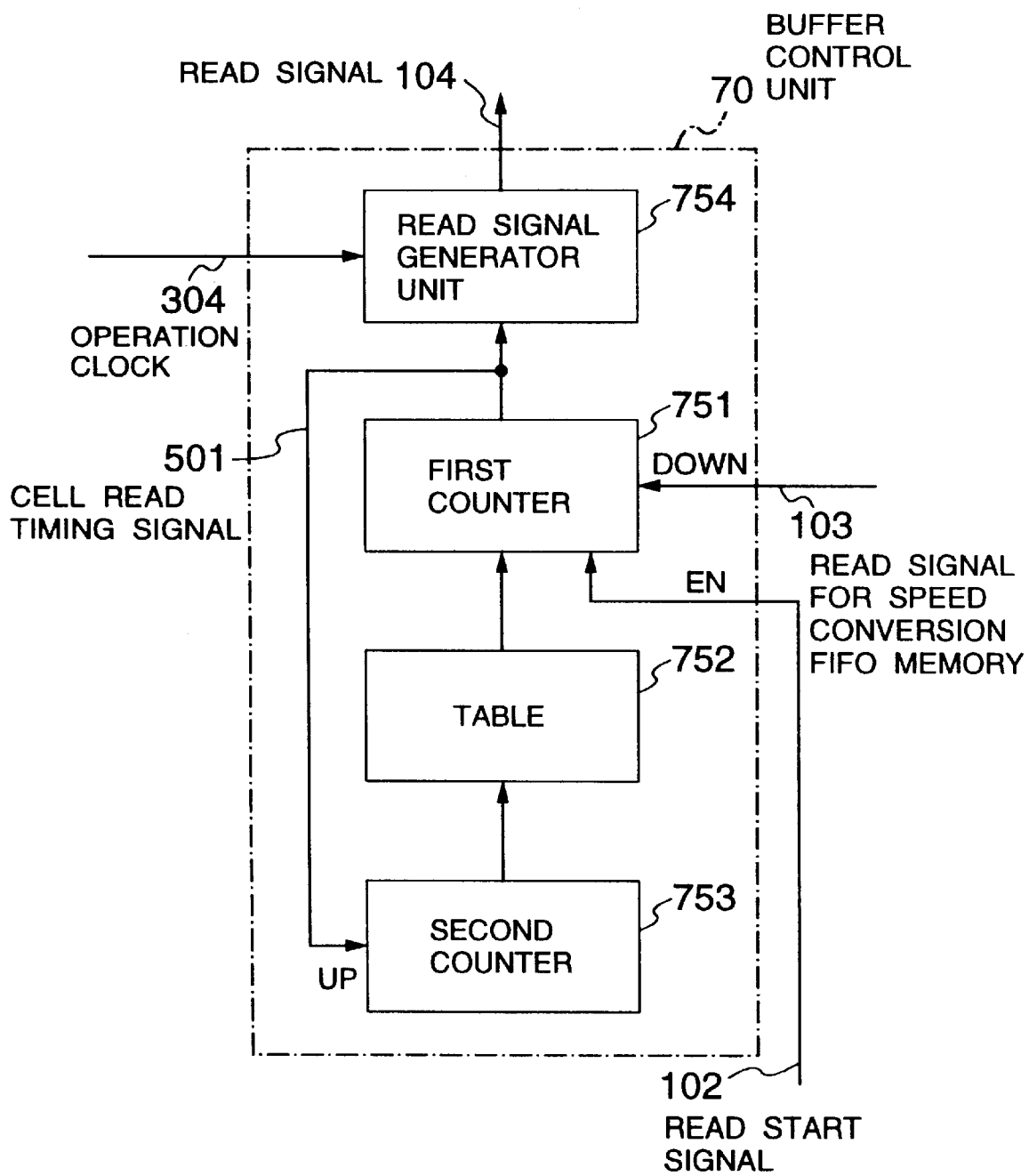
FIG. 5 is a block diagram showing the structure of the buffer control unit according to a third embodiment of the invention.

FIG. 5 shows the structure of the buffer control unit 70 according to the third embodiment of the invention. In FIG. 5, reference numeral 751 represents a first counter for generating a timing when a cell is read from the delay fluctuation absorption buffer 2. The first counter 751 starts counting after the read start signal 102 becomes "1" and is decremented by "1" each time the speed conversion FIFO memory 5 outputs data. A value output from the table 752 is loaded in the first counter 751 when the first counter 751 takes a value of "0", and at the same time a cell read timing signal 501 of "1" is supplied to the second counter 753 and read signal generator unit 754. The table 752 outputs a preset value stored at an address indicated by the value of the second counter 753. This table 752 stores an interval of reading cells from the delay fluctuation absorption buffer 2, the interval being set such that data of 128 cells including the error correcting codes can be read from the delay fluctuation absorption buffer 2 during the period while the data of 124 cells is output from the speed conversion FIFO memory 5. The second counter 753 counts up its count in response to the cell read timing signal 501 and outputs an address to the table 752. The read signal generator unit 754 generates the read signal 105 for reading a cell from the delay fluctuation absorption buffer 2.

Figure 6:
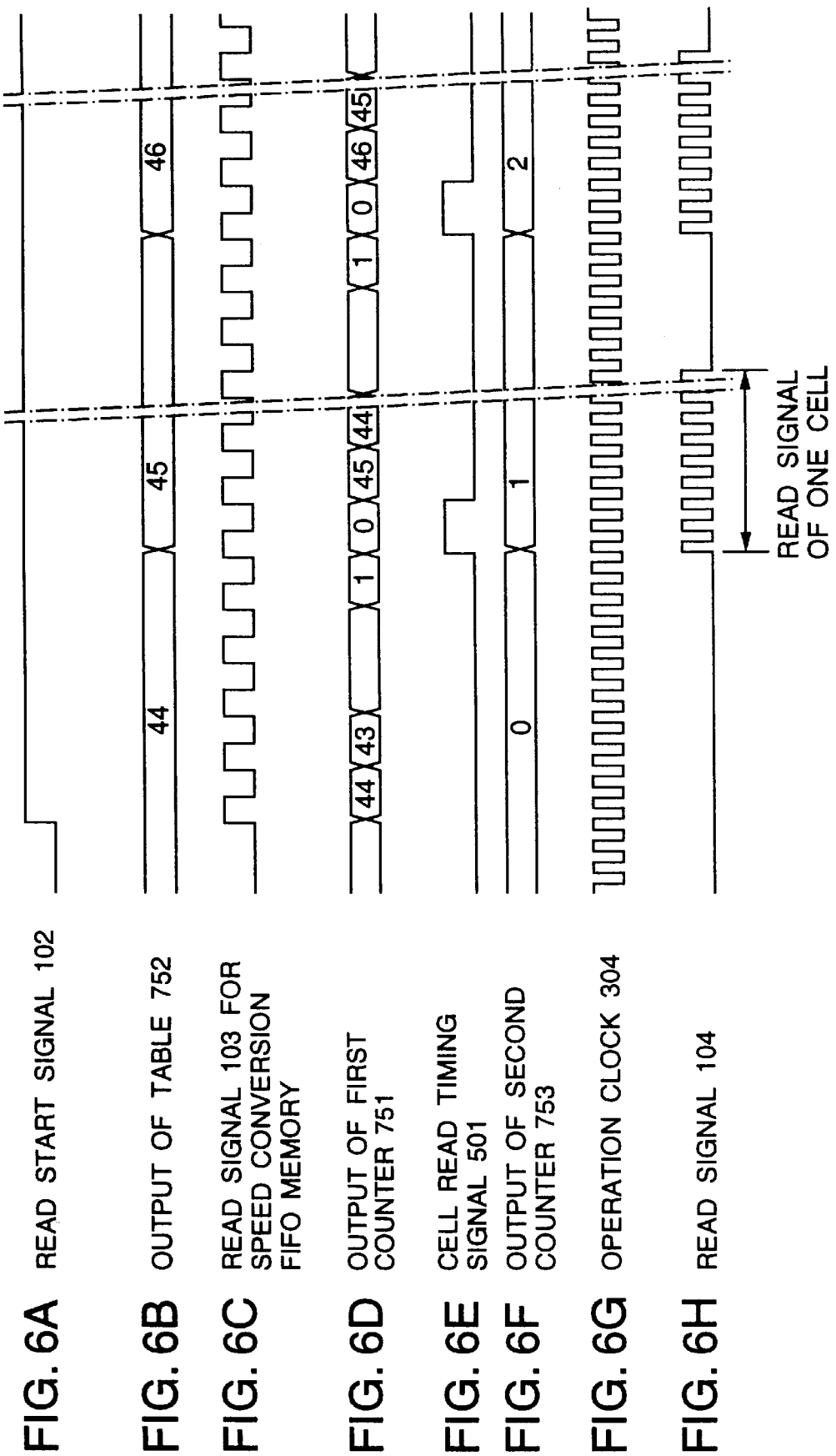
FIGS. 6A to 6H are timing charts illustrating the operation of the third embodiment.

Next, the operation of the buffer control unit 70 of this embodiment will be described with reference to FIGS. 6A to 6H. After the read start signal 102 from the delay fluctuation absorption control unit 60 becomes "1" (FIG. 6A), the first counter 751 loads the cell read interval (FIG. 6B) and decrements (FIG. 6D) its count each time the speed conversion FIFO memory read signal 103 (FIG. 6C) is input. When the value of the first counter 751 becomes "0", the cell read timing signal 501 is set to "1" (FIG. 6E). At this time, the second counter 753 is incremented by "1" in response to the cell read timing signal 501 and outputs a new address value to the table 752 (FIG. 6F). The table 752 outputs a new cell read interval stored at the new address supplied from the second counter 753, to the first counter 751. The first counter 751 again decrements the new cell read interval loaded from the table 752 each time the speed conversion FIFO memory read signal 103 is input. In accordance with the cell read timing signal 501 and operation clock 304 (FIG. 6G), the read signal generator unit 754 outputs the buffer read signal 104 for reading a cell from the delay fluctuation absorption buffer 2 (FIG. 6H).

In the above manner, with the buffer control unit 70 of this embodiment, data of 128 cells including the error correcting codes can be read from the delay fluctuation absorption buffer 2 during the period while the data of 124 cells is output from the speed conversion FIFO memory 5.

According to the third embodiment, the process of the buffer control unit is executed at a speed (e.g., the speed of transmitting cells) faster than the transmission speed of recovered data. Therefore, although the buffer control unit of the first embodiment is required to be realized by analog circuits such as a PLL, it can be realized by digital circuits including the first and second counters, table, and read signal generator unit. The hardware scale of the buffer control unit can therefore be made small.

(Fourth Embodiment)

Figure 7:
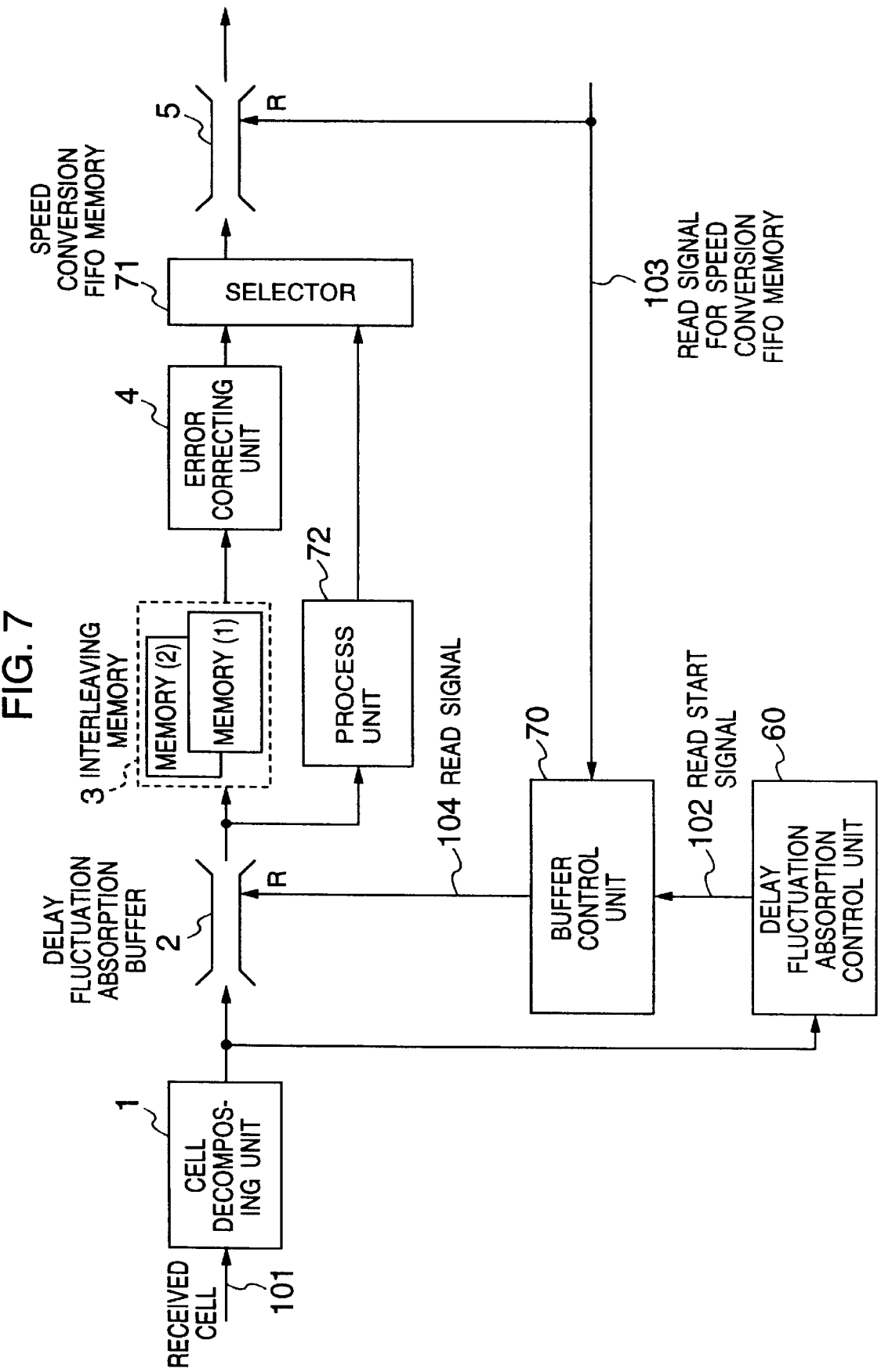
FIG. 7 is a block diagram showing the structure of a cell receiver according to a fourth embodiment of the invention.

FIG. 7 shows the fourth embodiment of the invention. In this embodiment, in addition to the structure of the cell receiver of the first embodiment, a selector 71 for selecting a signal to be supplied to the speed conversion FIFO memory 5 and a process unit 72 for performing a new process are provided. The other structures are the same as the first embodiment, and a duplicate description thereof is avoided. In this embodiment, a desired process can be selected from a plurality of processes. This desired process is executed by the process unit 72 provided between the delay fluctuation absorption buffer 2 and speed conversion FIFO memory 5, and selected by the selector 71. This embodiment may be applied also to the second and third embodiments.

In this embodiment, as appreciated from the first embodiment, the delay fluctuation absorption buffer for absorbing delay fluctuation and the buffer control unit for controlling reading a cell from the delay fluctuation absorption buffer are added to a conventional cell receiver. After the delay fluctuation of a received cell is absorbed by the delay fluctuation absorption buffer, the cell payload is stored in the interleaving memory. Accordingly, it is unnecessary for the interleaving memory to absorb the delay fluctuation, and the number of interleaving memories can be reduced, and the hardware scale of the cell receiver can be reduced.

Further, as will be appreciated from the second and third embodiments, the process by the buffer control unit is executed at a speed faster than the transmission speed of recovered data. Accordingly, the hardware scale of the cell receiver can be reduced.

Furthermore, in the fourth embodiment, the process unit for executing a desired process and the selector for selecting processes are additionally provided. Accordingly, a desired process can be selected from a plurality of processes.

Figure 8:
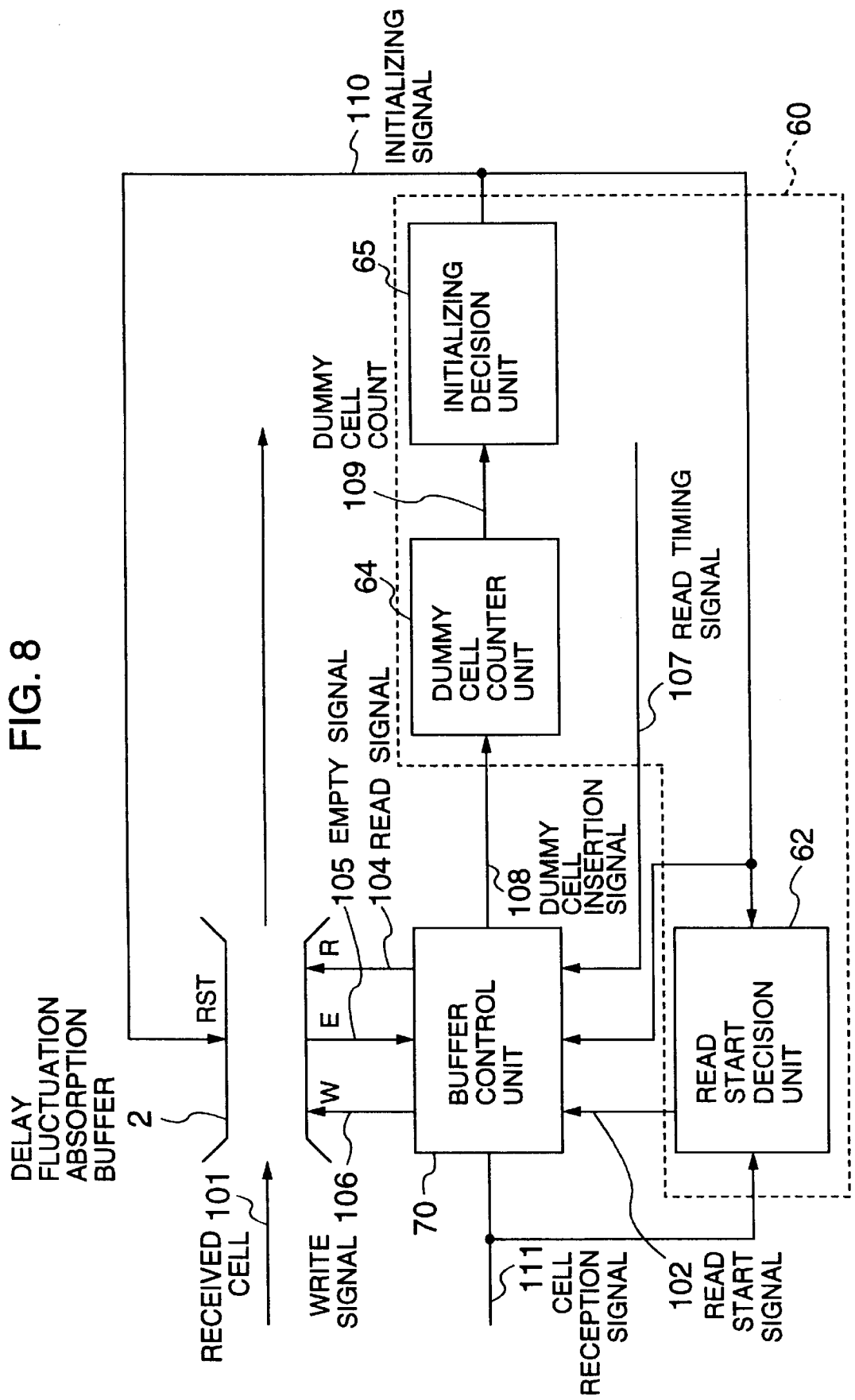
FIG. 8 is a block diagram showing the structure of a delay fluctuation absorption control unit of the invention.

FIG. 8 shows another example of the delay fluctuation absorption control unit 60 and buffer control unit 70. A delay fluctuation absorption buffer 2 has a W terminal, an R terminal, and an RST terminal. While the signal at the W terminal is "1", a received cell is stored, and while the signal at the R terminal is "1", a received cell is output. If the delay fluctuation absorption buffer 2 is empty, an empty signal 105 of "1" is output from an E terminal and an initializing signal 110 of "1" is input to the RST terminal to initialize the delay fluctuation absorption buffer 2. Reference numeral 62 represents a read start decision unit for deciding a timing when a cell is read from the delay fluctuation absorption buffer 2, the read start decision unit 62 being initialized by the initializing signal 110. In accordance with the empty signal 105 indicating an empty state of the delay fluctuation absorption buffer 2 and a read timing signal 107 indicating a read timing, the buffer control unit 70 generates a cell write signal 106 and a cell read signal 104 and outputs them to the delay fluctuation absorption buffer 2. The buffer control unit 70 is initialized by the initializing signal 110. If the empty signal 105 is "1" and the read timing signal 107 is "1", the buffer control unit 70 decides that a dummy cell is to be output from the delay fluctuation absorption buffer 2, and outputs a dummy cell insertion signal 108 of "1". A dummy cell counter unit 64 counts up the number of consecutive dummy cell insertion signals 108 of "1", the dummy cell counter unit 64 being initialized by the read signal 104. An initializing decision unit 65 generates the initializing signal 110 for initializing the delay fluctuation absorption buffer 2, read start decision unit 62, and buffer control unit 70 when the count of the dummy cell counter unit 64 exceeds a preset threshold value.

Figure 9:
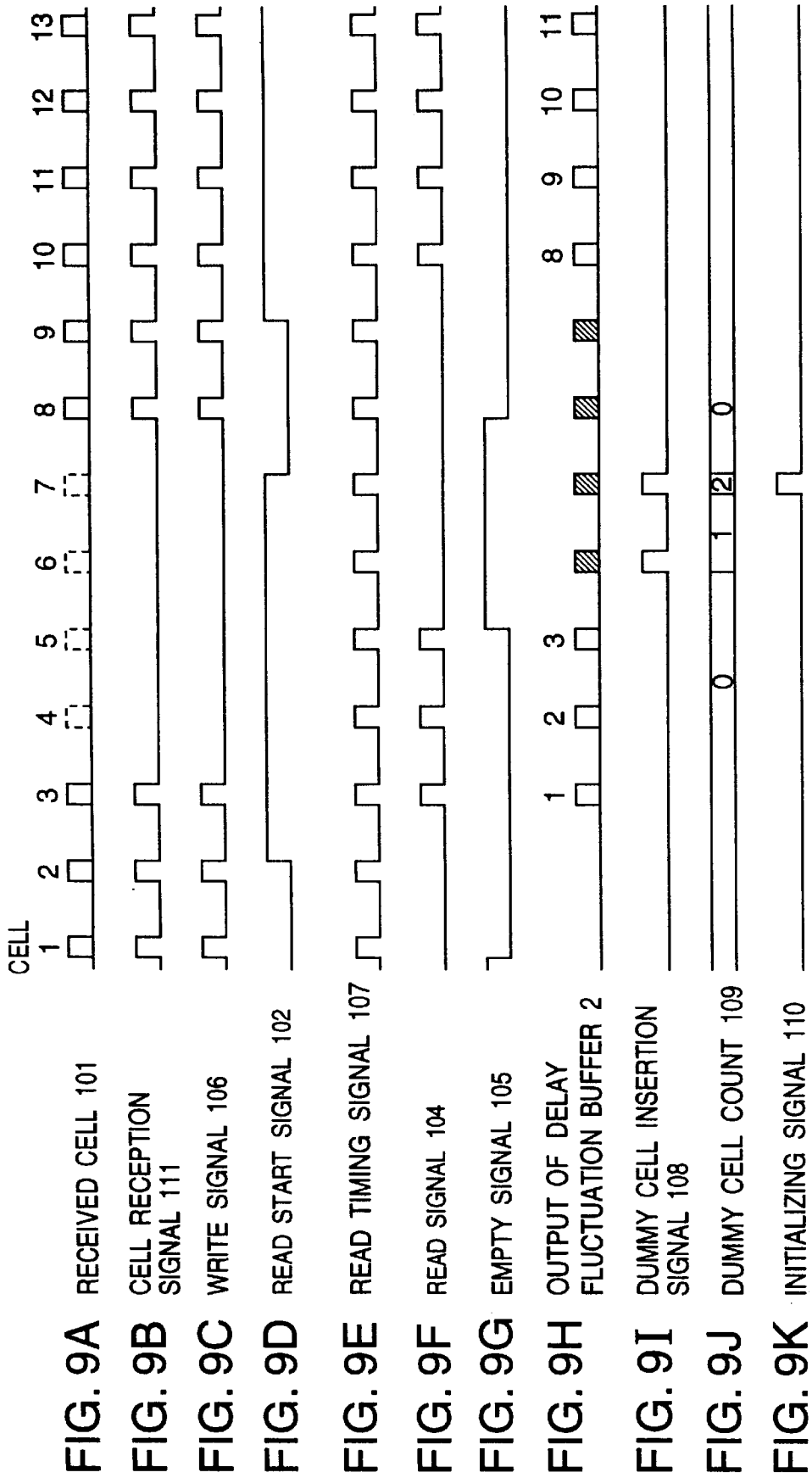
FIGS. 9A to 9K are timing charts illustrating the operation of the delay fluctuation control unit shown in FIG. 8.

The operation of the delay fluctuation absorption control unit will be described with reference to the timing charts of FIG. 9A to 9K. A received cell 101 (FIG. 9A) is written in the delay fluctuation absorption buffer 2 in response to the write signal 106 (FIG. 9C) output from the buffer control unit 70. The cell reception signal 111 (FIG. 9B) takes the value "1" only while a cell is being received, and the buffer control unit 70 outputs this signal as the write signal 106. In order to absorb the delay fluctuation of the received cell 101, the read start decision unit 62 counts the number of cell reception signals 111 of "1", and after this count reaches a certain delay fluctuation absorption amount, outputs the read start signal 102 of "1" indicating permission for reading a cell from the delay fluctuation absorption buffer 2 (FIG. 9D). In this example, this read start signal 102 (FIG. 9D) is generated based on the assumption that the delay fluctuation absorption amount is two cells. The buffer control unit 70 outputs the read timing signal 107 (FIG. 9E) as the read signal 104 (FIG. 9F) for reading a cell from the delay fluctuation absorption buffer 2 if the read timing signal 107 is "1" and the delay fluctuation absorption buffer 2 is not empty. If cell discards occur because of a short break or the like, and when the delay fluctuation absorption buffer 2 becomes empty and the empty signal 105 becomes "1", the read timing signal 107 is not output as the read signal 104, but an output value of the delay fluctuation absorption buffer 2 itself is output as a dummy cell (FIG. 9H, hatched portions), and the dummy cell insertion signal 108 of "1" is output (FIG. 9I).

The dummy cell counter unit 64 counts the number of dummy cell insertion signals 108 of "1" (FIG. 9J), and outputs the count to the initializing decision unit 65. The initializing decision unit 65 decides that cell discards occurred because of a short break or the like, if the count of the dummy cell counter unit 64 exceeds the threshold value, and outputs the initializing signal 110 of "1" (FIG. 9K) assuming that the threshold value is "2".

In response to the initializing signal 110 of "1", the delay fluctuation absorption buffer 2, read start decision unit 62, and buffer control unit 70 are initialized to resume the delay fluctuation absorption operation. Thereafter, the delay fluctuation absorption is normally performed, and the cell with the delay fluctuation absorbed is output (the eighth and following cells in FIG. 9H).

As explained above, if the number of dummy cells counted by the cell counter unit 64 exceeds the preset threshold value, the initializing decision unit 65 decides that cell discards occurred because of a short break or the like, and initializes the delay fluctuation absorption buffer 2, read start decision unit 62, and buffer control unit 70 to resume the delay fluctuation absorption operation. In this manner, it is possible to prevent normal cells from being discarded by initializing the delay fluctuation absorption buffer.

Figure 10:
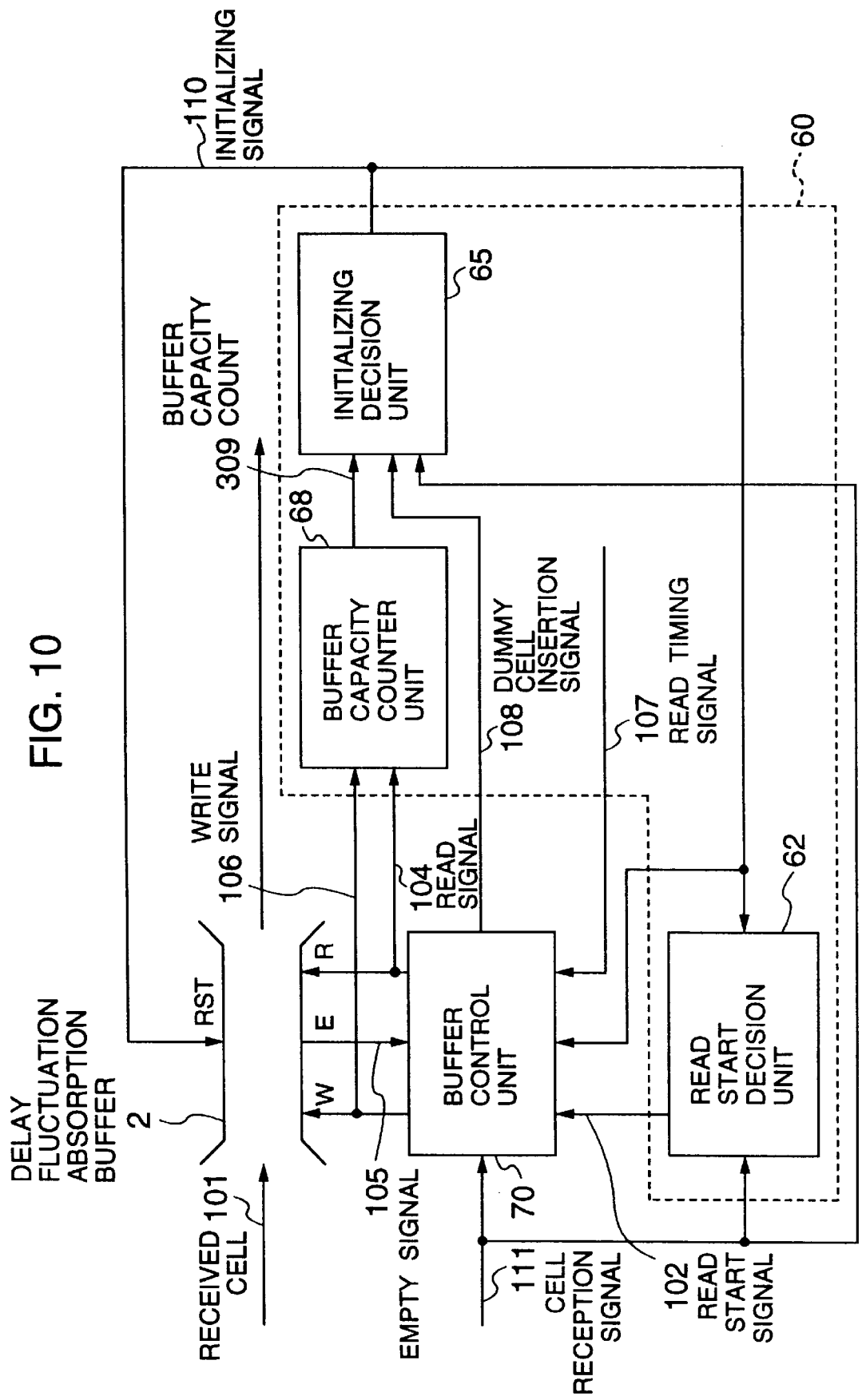
FIG. 10 is a block diagram showing another structure of the delay fluctuation absorption control unit of the invention.

FIG. 10 shows another example of the delay fluctuation absorption control unit 60 shown in FIG. 8. When it is decided that a dummy cell is output from the delay fluctuation absorption buffer 2, the buffer control unit 70 outputs the dummy insertion signal 108 of "1". A buffer capacity counter unit 68 counts the number of cells in the delay fluctuation absorption buffer 2; this counter unit 68 counts up its count in response to the write signal 106 and counts down its count in response to the read signal 104. The initializing decision unit 65 initializes the delay fluctuation absorption buffer 2, read start decision unit 62, and buffer control unit 70, monitors the output value of the buffer capacity counter unit 68 after a dummy cell is output from the delay fluctuation absorption buffer 2, and if this value does not change from "0" during a preset period, decides that cell discards occurred because of a short break or the like, and outputs the initializing signal 110 of "1".

Figure 11:
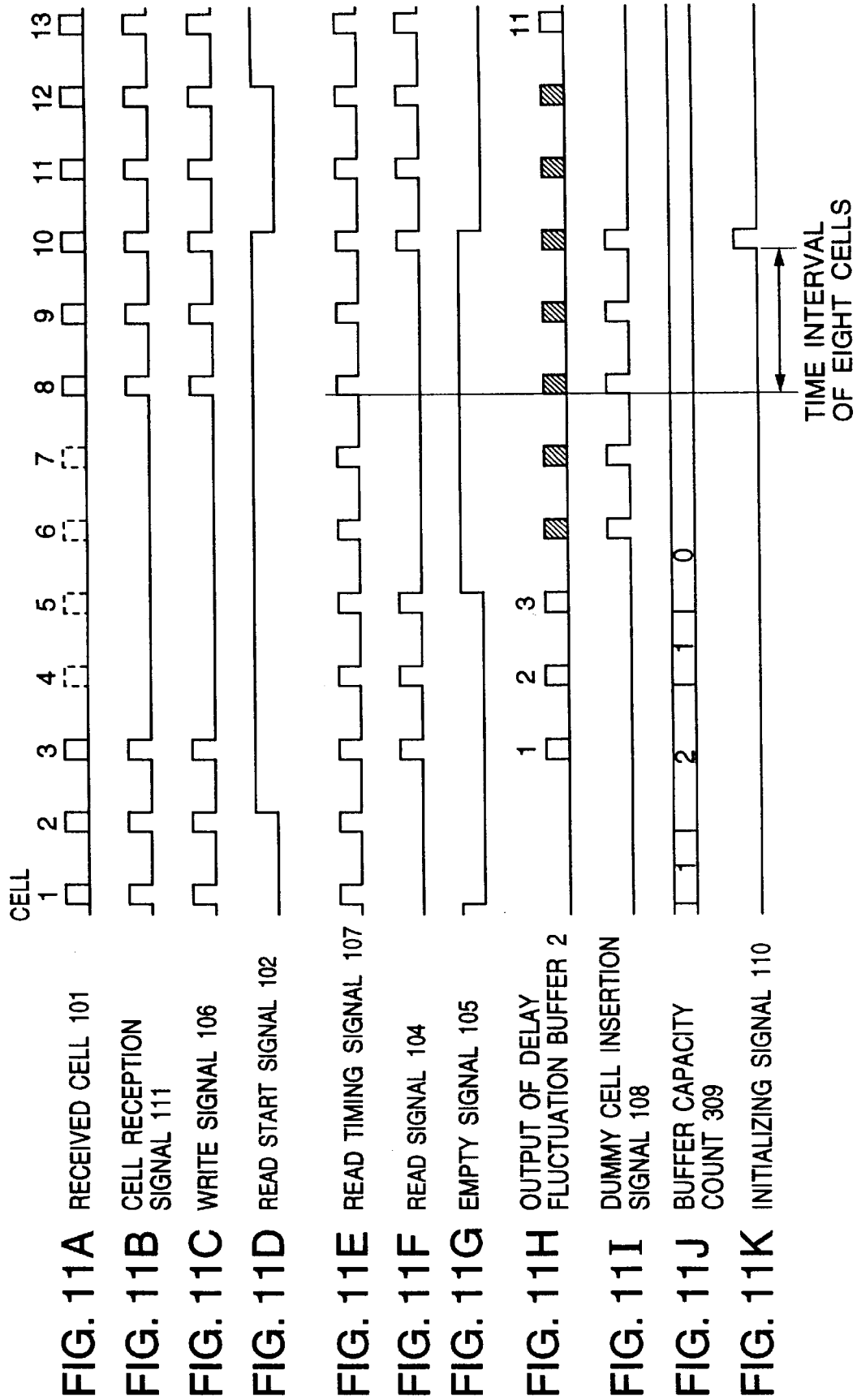
FIGS. 11A to 11K are timing charts illustrating the operation of the delay fluctuation control unit shown in FIG. 10.
Figure 12:
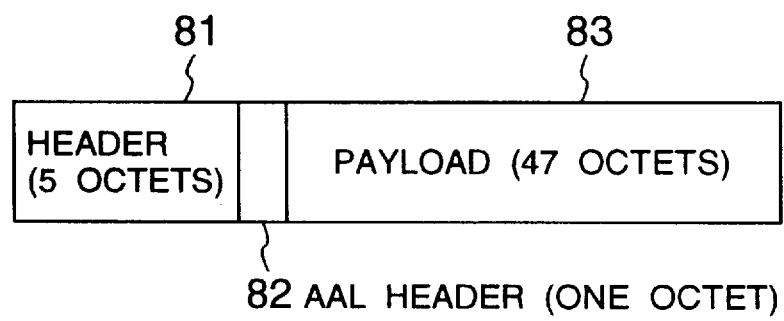
FIG. 12 shows the data format of a cell used by a cell receiver.
Figure 15:
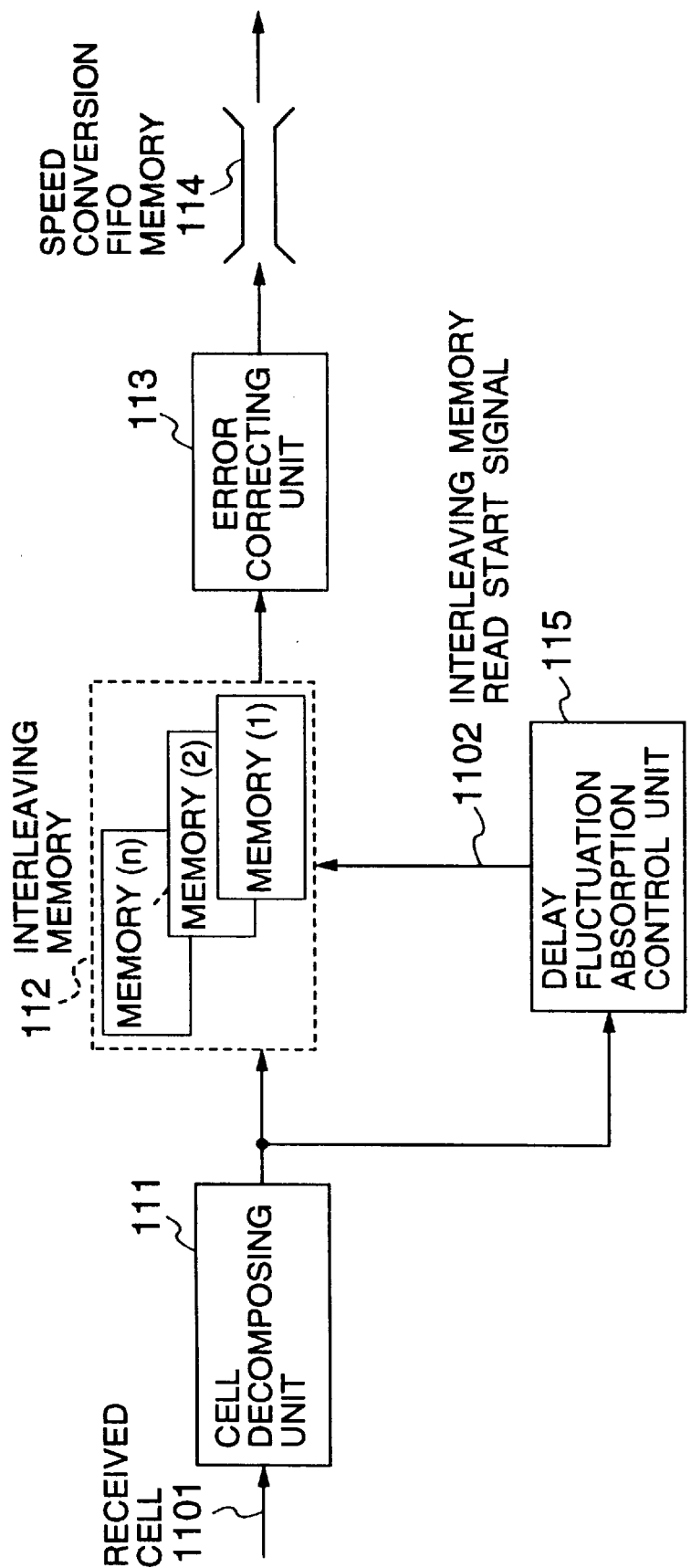
FIG. 15 is a block diagram showing the structure of a conventional cell receiver.

The operation of the delay fluctuation absorption control unit will be described with reference to the timing charts of FIG. 11A to 11K. A received cell 101 (FIG. 11A) is written in the delay fluctuation absorption buffer 2 in response to the write signal 106 (FIG. 11C) output from the buffer control unit 70. The cell reception signal 111 (FIG. 11B) takes the value "1" only while a cell is being received, and the buffer control unit 70 outputs this signal as the write signal 106. In order to absorb the delay fluctuation of the received cell 101, the read start decision unit 62 counts the number of cell reception signals 111 of "1", and after this count reaches a certain delay fluctuation absorption amount, outputs the read start signal 102 of "1" indicating permission for reading a cell from the delay fluctuation absorption buffer 2 (FIG. 11D). In this example, this read start signal 102 (FIG. 11D) is generated based on the that the delay fluctuation absorption amount is two cells. The buffer control unit 70 outputs the read timing signal 107 (FIG. 11E) as the read signal 104 (FIG. 11F) for reading a cell from the delay fluctuation absorption buffer 2 if the read timing signal 102 is "1" and the delay fluctuation absorption buffer 2 is not empty. If cell discards occur because of a short break or the like, and when the delay fluctuation absorption buffer 2 becomes empty and the empty signal 105 becomes "1", the read timing signal 107 is not output as the read signal 104, but an output value of the delay fluctuation absorption buffer 2 itself is output as a dummy cell (FIG. 11H, hatched portions), and the dummy cell insertion signal 108 of "1" is output (FIG. 11I).

The buffer capacity counter unit 68 counts the number of cells in the delay fluctuation absorption buffer 2, by using the write signal 106 and read signal 104, and outputs the count to the initializing decision unit 65. The initializing decision unit 65 monitors the buffer capacity count 309 after the dummy cell insertion signal 108 becomes "0", decides that cell discards occurred because of a short break or the like, if the buffer capacity count does not change from "0" during a preset period, and outputs the initializing signal 110 of "1" assuming that the period corresponds to eight cells. In the example shown in FIGS. 11A to 11K, since the buffer capacity count 309 does not change from "0" after the dummy cell insertion, it is decided that a cell discard occurred because of a short break or the like, and the initializing signal 110 of "1" is output.

In response to the initializing signal 110 of "1", the delay fluctuation absorption buffer 2, read start decision unit 62, and buffer control unit 70 are initialized to resume the delay fluctuation absorption operation. Thereafter, the delay fluctuation absorption is normally performed, and the cell with the delay fluctuation absorbed is output (the 11-th and following cells in FIG. 11H).

As explained above, the buffer capacity counter unit 68 counts the number of cells in the delay fluctuation absorption buffer 2. The initializing decision unit 70 monitors the output value of the buffer capacity counter unit 68 after a dummy cell insertion, and if this value does not change from "0" during the preset period, decides that cell discards occurred because of a short break or the like, and initializes the delay fluctuation absorption buffer 2, read start decision unit 62, and buffer control unit 70 to resume the delay fluctuation absorption operation. In this manner, it is possible to prevent normal cells from being discarded by initializing the delay fluctuation absorption buffer.

As will be appreciated from the example shown in FIG. 8, the delay fluctuation absorption control unit 60 includes the dummy cell counter unit 64 for counting the number of dummy cells output from the delay fluctuation absorption buffer and the initializing decision unit 65 for deciding from the count of the counter unit whether or not any cell discard has occurred because of a short break or the like, and if the number of dummy cells counted by the cell counter unit exceeds the preset threshold value, the initializing decision unit decides that cell discards occurred because of a short break or the like, and initializes the delay fluctuation absorption buffer and read start decision unit to resume the delay fluctuation absorption operation. In this manner, it is possible to prevent normal cells from being discarded by initializing the delay fluctuation absorption buffer.

As will be appreciated from the example shown in FIG. 10, the delay fluctuation absorption control unit 60 includes the buffer capacity counter unit 68 for counting the number of dummy cells in the delay fluctuation absorption buffer and the initializing decision unit 65 for deciding whether any cell discard has occurred because of a short break or the like, and the initializing decision unit monitors the output value of the buffer capacity counter unit after a dummy cell insertion, and if this value does not change from "0" during the preset period, decides that cell discards occurred because of a short break or the like, and initializes the delay fluctuation absorption buffer, read start decision unit, and buffer control unit to resume the delay fluctuation absorption operation. In this manner, it is possible to prevent normal cells from being discarded by initializing the delay fluctuation absorption buffer.

What is claimed is:

1. A cell receiver for receiving a cell assembled from data of a fixed speed and recovering the data of the original fixed speed, comprising:

a delay fluctuation absorption buffer for storing a received cell and absorbing a delay fluctuation of the received cell:

an interleaving memory for storing data output from said delay fluctuation absorption buffer for the execution of octet interleaving;

error correcting means for correcting any error in the data by using error detecting codes included in the data output from said interleaving memory;

a speed conversion FIFO memory for storing the data excepting the error correcting codes output from said error correcting means, and for converting the data into data having the original fixed speed by reading the data stored in the speed conversion FIFO memory out in synchronism with a first read signal;

delay fluctuation absorption control means for counting the number of received cells and generating a read start signal indicating a timing when a cell is read from said delay fluctuation absorption buffer; and buffer control means, responsive to the first read signal, for generating a second read signal for reading a cell from said delay fluctuation absorption buffer.

2. A cell receiver according to claim 1, wherein said buffer control means comprises:

a counter responsive to the read start signal supplied from said delay fluctuation absorption control means for counting the first read signal;

a table for outputting a preset value stored therein at an address having a value output from said counter; and read signal generator means for generating the second read signal by using a cell read timing signal supplied from said table and an operation clock faster than a transmission speed of recovered data.

3. A cell receiver for receiving a cell assembled from data of a fixed speed and recovering the data of the original fixed speed, comprising:

a delay fluctuation absorption buffer for storing a received cell and absorbing a delay fluctuation of the received cell:

an interleaving memory for storing data output from said delay fluctuation absorption buffer for the execution of octet interleaving;

error correcting means for correcting any error in the data by using error detecting codes included in the data output from said interleaving memory;

a speed conversion FIFO memory for storing the data excepting the error correcting codes output from said error correcting means and for converting the data into data having the original fixed speed;

delay fluctuation absorption control means for counting the number of received cells and generating a read start signal indicating a timing when a cell is read from said delay fluctuation absorption buffer; and buffer control means for generating a read signal for reading a cell from said delay fluctuation absorption buffer, wherein said buffer control means includes:

a first counter responsive to the read start signal supplied from said delay fluctuation absorption control means for counting down its count in response to a FIFO memory read signal for reading the data from the speed conversion FIFO memory and outputting a cell read timing signal when the count of said first counter reaches a preset value, a second counter for counting up its count in response to the cell read signal from said first counter, a table for outputting a new cell read interval to said first counter by updating its address in response to the count of said first counter, and read signal generator means for generating the read signal by using the cell read timing signal supplied from said first counter and an operation clock faster than a transmission speed of recovered data.

4. A cell receiver according to claim 1, further comprising:

process means for executing a plurality of processes; and selecting means for selecting one of the plurality of processes, wherein one of the plurality of processes can be selected by said selecting means.

5. A cell receiver for receiving a cell assembled from data of a fixed speed and recovering the data of the original fixed speed, comprising:

a delay fluctuation absorption buffer for storing a received cell and absorbing a delay fluctuation of the received cell:

an interleaving memory for storing data output from said delay fluctuation absorption buffer for the execution of octet interleaving;

error correcting means for correcting any error in the data by using error detecting codes included in the data output from said interleaving memory a speed conversion FIFO memory for storing the data excepting the error correcting codes output from said error correcting means and for converting the data into data having the original fixed speed;

delay fluctuation absorption control means for counting the number of received cells and generating a read start signal indicating a timing when a cell is read from said delay fluctuation absorption buffer; and buffer control means for generating a read signal for reading a cell from said delay fluctuation absorption buffer, wherein said delay fluctuation absorption control means includes:
- dummy cell counter means for counting the number of dummy cells output from said delay fluctuation absorption buffer,
- initializing decision means for deciding that cell discards occurred if the count of said dummy cell counter means exceeds a preset threshold value, and
- read start decision means responsive to an initializing signal from said initializing decision means for deciding a timing when a cell is read from said delay fluctuation absorption buffer.

6. A cell receiver for receiving a cell assembled from data of a fixed speed and recovering the data of the original fixed speed, comprising:
- a delay fluctuation absorption buffer for storing a received cell and absorbing a delay fluctuation of the received cell:
  - an interleaving memory for storing data output from said delay fluctuation absorption buffer for the execution of octet interleaving;
  - error correcting means for correcting any error in the data by using error detecting codes included in the data output from said interleaving memory;
  - a speed conversion FIFO memory for storing the data excepting the error correcting codes output from said error correcting means and for converting the data into data having the original fixed speed;
- delay fluctuation absorption control means for counting the number of received cells and generating a read start signal indicating a timing when a cell is read from said delay fluctuation absorption buffer; and
- buffer control means for generating a read signal for reading a cell from said delay fluctuation absorption buffer, wherein said delay fluctuation absorption control means includes:
- buffer capacity counter means for counting the number of cells in said delay fluctuation absorption buffer,
- initializing decision means for deciding that cell discards occurred if the delay fluctuation absorption buffer becomes empty and outputs a dummy cell and the value of said buffer capacity counter means does not change from zero during a preset period even if a cell is received thereafter, and
- read start decision means responsive to an initializing signal from said initializing decision means for deciding a timing when a cell is read from said delay fluctuation absorption buffer.

7. A cell receiver according to claim 1, wherein the second read signal generated by the buffer control means reads a cell from the delay fluctuation absorption buffer at a reading speed that is faster than the original fixed speed at which data is read out of the speed conversion FIFO memory in synchronism with the first read signal.

* * * * *